United States Patent
Nielsen et al.

(10) Patent No.: US 6,416,624 B1
(45) Date of Patent: Jul. 9, 2002

(54) SPRAY APPLICATION OF AN ADDITIVE COMPOSITION TO SHEET MATERIALS

(75) Inventors: Kenneth A. Nielsen, Charleston; Jeffrey D. Goad, Barboursville, both of WV (US); Duane F. Baumert, Newtown, CT (US); Richard S. Cesaretti, Kenna, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/529,025

(22) PCT Filed: Oct. 9, 1998

(86) PCT No.: PCT/US98/21382

§ 371 (c)(1),
(2), (4) Date: Jun. 14, 2000

(87) PCT Pub. No.: WO99/19081

PCT Pub. Date: Apr. 4, 1999

Related U.S. Application Data

(60) Provisional application No. 60/062,028, filed on Oct. 10, 1997.

(51) Int. Cl.[7] .......................... D21H 23/50; D21H 19/14
(52) U.S. Cl. ..................... 162/155; 162/158; 162/184; 427/424; 427/391
(58) Field of Search ................................ 162/112, 119, 162/135, 136, 137, 158, 183, 184, 185, 186, 204, 207, 221, 222; 427/209, 210, 211, 421, 424, 389.9, 391; 239/1, DIG. 10

(56) References Cited

U.S. PATENT DOCUMENTS

| | | | |
|---|---|---|---|
| 4,882,107 A | 11/1989 | Cavender et al. ............. 264/51 |
| 4,923,720 A | 5/1990 | Lee et al. ................... 427/422 |
| 4,940,513 A | 7/1990 | Spendel ...................... 162/113 |
| 4,950,545 A | 8/1990 | Walter et al. ............... 428/445 |
| 4,959,125 A | 9/1990 | Spendel ...................... 162/158 |
| 5,009,367 A | 4/1991 | Nielsen ......................... 239/3 |
| 5,027,742 A | 7/1991 | Lee et al. ................... 118/300 |
| 5,046,514 A * | 9/1991 | Bolt ............................ 131/359 |
| 5,057,342 A | 10/1991 | Hoy et al. .................. 427/422 |
| 5,059,282 A | 10/1991 | Ampulski et al. .......... 162/111 |
| 5,066,522 A | 11/1991 | Cole et al. ................... 427/422 |
| 5,098,194 A | 3/1992 | Kuo et al. ................... 366/144 |
| 5,106,650 A | 4/1992 | Hoy et al. .................... 427/27 |
| 5,108,799 A | 4/1992 | Hoy et al. .................. 427/422 |
| 5,141,156 A | 8/1992 | Hoy et al. .................. 239/135 |
| 5,164,046 A | 11/1992 | Ampulski et al. .......... 162/111 |
| 5,171,089 A | 12/1992 | Kuo et al. ................... 366/146 |
| 5,171,613 A | 12/1992 | Bok et al. .................. 427/422 |
| 5,178,325 A * | 1/1993 | Nielsen ........................ 239/1 |
| 5,190,373 A | 3/1993 | Dickson et al. ............. 366/146 |
| 5,203,843 A | 4/1993 | Hoy et al. .................. 239/135 |
| 5,211,342 A | 5/1993 | Hoy et al. .................. 239/707 |
| 5,215,253 A | 6/1993 | Saidman et al. .............. 239/61 |
| 5,215,626 A | 6/1993 | Ampulski et al. .......... 162/112 |
| 5,227,242 A | 7/1993 | Walter et al. ............... 428/446 |
| 5,246,545 A | 9/1993 | Ampulski et al. .......... 162/112 |
| 5,246,546 A | 9/1993 | Ampulski .................... 162/112 |
| 5,290,603 A | 3/1994 | Nielsen et al. .............. 427/421 |
| 5,290,604 A | 3/1994 | Nielsen ....................... 427/421 |
| 5,304,001 A | 4/1994 | Kuo et al. ................... 366/132 |
| 5,304,390 A | 4/1994 | Condron et al. ............... 427/8 |
| 5,308,648 A | 5/1994 | Prince et al. ................ 427/212 |
| 5,312,862 A | 5/1994 | Nielsen et al. .............. 524/552 |
| 5,318,225 A | 6/1994 | Condron ........................ 239/1 |
| 5,374,305 A | 12/1994 | Glancy et al. .......... 106/287.23 |
| 5,385,643 A | 1/1995 | Ampulski .................... 162/135 |
| 5,389,204 A | 2/1995 | Ampulski .................... 162/135 |
| 5,403,089 A | 4/1995 | Kuo et al. ................... 366/132 |
| 5,419,487 A | 5/1995 | Nielsen et al. ................ 239/10 |
| 5,455,076 A | 10/1995 | Lee et al. ................... 427/421 |
| 5,464,154 A | 11/1995 | Nielsen ......................... 239/1 |
| 5,466,490 A | 11/1995 | Glancy et al. .............. 427/422 |
| 5,505,539 A | 4/1996 | Lee et al. ................. 366/152.2 |
| 5,509,959 A | 4/1996 | Nielsen et al. ......... 106/287.35 |
| 5,520,942 A * | 5/1996 | Sauer, Jr. et al. ........... 426/289 |

(List continued on next page.)

FOREIGN PATENT DOCUMENTS

| | | | |
|---|---|---|---|
| JP | 62238867 | 10/1987 | |
| JP | 3032875 | * 11/1991 | ............ B05D/1/26 |
| JP | 5068936 | 3/1993 | |
| JP | 6086956 | * 3/1994 | ............ B05D/1/26 |
| WO | 9314259 | 7/1993 | .......... D06M/11/76 |
| WO | 9535411 | 12/1995 | .......... D21H/21/24 |
| WO | 9535412 | 12/1995 | .......... D21H/21/24 |
| WO | 9608601 | 3/1996 | .......... D21H/19/32 |
| WO | 9624723 | 8/1996 | .......... D21H/19/18 |
| WO | 9704170 | 2/1997 | .......... D21H/21/22 |
| WO | 9717143 | 5/1997 | ............ B05D/1/18 |

OTHER PUBLICATIONS

Chemical Engineering Science, N. Dombroski et al. 1963, vol. 18, pp. 203–214. Pergamon Press Ltd., Oxford. Printed in Great Britain.

Nordson "Cross–Cut Airless Spray Gun Nozzles" brochure, Nordson Corp. 1984, Revised 5/85. Printed in U.S.A.

*Primary Examiner*—Peter Chin
*Assistant Examiner*—Eric Hug

(57) ABSTRACT

The present invention is directed to methods for the spray application of additive compositions containing additive materials in the manufacture of sheet material products, such as paper products, textile products, and flexible sheet products by using compressed fluids, such as carbon dioxide and ethane, as a spraying medium. Additive compositions with high viscosity and which are substantially free of water and/or volatile solvent can be applied to sheet materials. Water-borne additive compositions with reduced water content can also be applied to sheet materials. One preferred spray method uses a decompressive spray of the compressed fluid which produces a uniform spray pattern and a narrow droplet size distribution that can improve application efficiency and quality when additive compositions are applied during the spraying step to rapidly conveyed sheet materials.

14 Claims, No Drawings

U.S. PATENT DOCUMENTS

| | | | |
|---|---|---|---|
| 5,525,345 A | 6/1996 | Warner et al. | 424/402 |
| 5,529,665 A | 6/1996 | Kaun | 162/111 |
| 5,552,020 A | 9/1996 | Smith et al. | 162/164.4 |
| 5,558,873 A | 9/1996 | Funk et al. | 424/401 |
| 5,575,891 A | 11/1996 | Trokhan et al. | 102/111 |
| 5,591,306 A | 1/1997 | Kaun | 162/107 |
| 5,601,871 A | 2/1997 | Krzysik et al. | 427/288 |
| 5,614,293 A | 3/1997 | Krzysik et al. | 428/211 |
| 5,622,599 A * | 4/1997 | Sproule et al. | 162/186 |
| 5,709,910 A * | 1/1998 | Argyle et al. | 427/434.2 |
| 5,716,558 A | 2/1998 | Nielsen et al. | 264/13 |
| 5,789,505 A * | 8/1998 | Wilkinson et al. | 526/209 |
| 6,123,795 A * | 9/2000 | Symons | 156/245 |

\* cited by examiner

SPRAY APPLICATION OF AN ADDITIVE COMPOSITION TO SHEET MATERIALS

This Application is a 371 of PCT/US98/21382 filed Oct. 9, 1998 which claims benefit of Prov. No. 60/062,028 filed Oct. 10, 1997.

FIELD OF THE INVENTION

This invention, in general, pertains to the field of applying additive compositions to sheet materials, such as paper, textile, and flexible sheets in the manufacture of sheet material products. More particularly, the present invention is directed to methods for the spray application of an additive composition to sheet materials in the manufacture of sheet material products by using a compressed fluid to enhance atomization and spray formation at lower volatile solvent levels and higher viscosities.

BACKGROUND OF THE INVENTION

Many industrial processes spray liquid compositions that contain volatile solvent to apply coatings, adhesives, and additives, or to spray dry materials. The solvent performs a variety of functions, such as to dissolve materials, provide a carrier medium for emulsions and dispersions, reduce viscosity for spraying, and to give proper flow characteristics upon application, such as film formation on a substrate or penetration into a porous or absorbent material. However, organic solvents are a major source of workplace and environmental air pollution and can be a fire hazard in manufacturing processes.

Therefore, water is often used as a solvent to avoid these problems. But, water can also have unfavorable characteristics which make it desirable to minimize its use in manufacturing processes. Many materials that are sprayed do not dissolve in water, so chemical agents such as surfactants must be used to emulsify or disperse the material into water in a stable form. Water has a relatively low evaporation rate and a high heat of evaporation, so drying the product can be slow and energy intensive, and often it must be heated to temperatures that can cause degradation in order to increase the drying rate. Because less water evaporates in the spray than with volatile organic solvents, the sprayed composition is often deposited with a viscosity that is too low for proper application, so performance can deteriorate. Furthermore, some substrates do not tolerate water; they are degraded by water absorption, which can cause swelling or weaken cohesiveness, or a water-borne composition does not properly wet the substrate, because water has a high interfacial tension, or the material is hydrophobic.

Successful and economical spray application of compositions also depends upon the spray properties produced by the spray method, in addition to the volatile solvent and viscosity characteristics of the composition sprayed. It is highly desirable that the spray method produces a spray that has a favorable droplet size, which will depend upon the application, and a narrow droplet size distribution that minimizes both overly large droplets, which typically give poor application quality, and overly small droplets, which typically become overspray and give inefficient deposition and increased material usage. It is also desirable for the spray pattern to have a uniform interior and tapered edges so that the composition is applied uniformly during application. The spray should not have an excessively high or low velocity or be exceedingly turbulent. The spray fan should have a proper width for a given application and provide good pattern control so that the composition is applied in the amounts and locations intended. It is also desirable for the spray method to be able to atomize high viscosity compositions in order to minimize or eliminate the use of volatile solvents.

Conventional spray methods such as air spray and airless spray methods, while each having certain favorable properties, also have undesirable characteristics that can limit their usefulness for applying compositions in manufacturing processes. Air spray methods provide an adjustable, uniform, feathered spray fan and fine atomization, but they require low viscosity, typically 50 to 100 centipoise, so they use a large proportion of volatile solvent. Air sprays are also highly turbulent and they produce a very broad droplet size distribution that has a large proportion of overly small droplets that become overspray and give low application efficiency. Airless spray methods can atomize higher viscosity materials with less solvent, but they typically produce coarse atomization and an overly large droplet size that is unsuitable for many applications. Airless sprays also produce nonuniform tailing or fishtailing spray patterns which make it difficult to apply compositions uniformly.

The conventional atomization mechanism of airless sprays is known in the art. In general, the material exits the orifice at ambient pressure as a liquid film that becomes unstable from shear induced by its high velocity relative to the surrounding air. Waves grow in the liquid film, become unstable, and break up into liquid filaments that likewise become unstable and break up into droplets. Atomization occurs because cohesion and surface tension forces, which hold the liquid together, are overcome by shear and fluid inertia forces, which break it apart. Often the liquid film extends far enough from the orifice to be visible before atomizing into droplets. The sprays are generally angular in shape and have a fan width that is close to the fan width rating of the spray tip. Viscous dissipation markedly reduces atomization energy, so higher viscosity gives coarser atomization. As used herein, the terms "liquid-film spray" and "liquid-film atomization" are understood to mean a spray, spray fan, or spray pattern in which atomization occurs by this conventional mechanism. Liquid-film sprays characteristically form a "tailing" or "fishtail" spray pattern, wherein material is distributed unevenly in the spray. Surface tension often gathers more liquid at the edges of the spray fan than in the center, which can produce coarsely atomized jets of material that sometimes separate from the spray. Examples of liquid-film sprays are shown photographically in FIGS. 4a, 4b, 4c, 4d, 10a, 11a, 12a, and 12b of U.S. Pat. No. 5,057,342 and in FIGS. 3a, 3b, 3c, 9a, 9b, and 9c of U.S. Pat. No. 5,009,367.

Supercritical fluids or subcritical compressed fluids, such as carbon dioxide or ethane, can produce a new airless spray atomization mechanism, which can produce fine droplet size and a feathered spray needed to apply high quality coatings. Without wishing to be bound by theory, the atomization is believed to be produced by the dissolved compressed fluid, such as carbon dioxide, becoming supersaturated as the spray mixture suddenly drops in pressure in the spray orifice. This creates a very large driving force for gasification, and very fine carbon dioxide gas bubbles convert the solution to a gas-liquid mixture. This is believed to alter the flow pressure by lowering the speed of sound to where it equals the flow velocity, which chokes the flow, so instead of dropping to atmospheric pressure, the flow exits the orifice at a relatively high pressure. This creates a pressurized zone outside the orifice in which the spray mixture expands freely to atmospheric pressure. The carbon dioxide gas released expands and produces an expansive force that overwhelms the liquid forces that would normally bind the fluid flow together. The expansion is constrained only by a groove cut across the outlet, which shapes the spray into a flat or oval fan. The spray width is adjusted by changing the pitch of the groove. A different atomization mechanism is evident because atomization appears to occur right at the spray orifice instead of away from it. No liquid film is visible at the orifice. Furthermore, the spray typically leaves the nozzle at a much wider angle than normal airless sprays and produces a "feathered" spray with tapered edges like an air spray. This frequently produces a rounded, parabolic-shaped spray fan, instead of a sharp angular fan. The spray typically has a wider fan width than conventional airless sprays produced by the same spray tip. As used herein, the terms "decompressive spray" and "decompressive atomization" are understood to mean to a spray, spray fan, or spray pattern that has these characteristics as described herein. Examples of decompressive sprays are shown photographically in FIGS. 3a, 3b, 3c, 3d, 3e, 10b, 11b, 12c, 12d, and 13 of U.S. Pat. No. 5,057,342 and in FIGS. 4b, 4c, 8, and 9d of U.S. Pat. No. 5,009,367.

A liquid-film spray can undergo a transition to a decompressive spray as the concentration of supercritical fluid or subcritical compressed fluid, such as carbon dioxide, is increased. The transition can also occur as the temperature is increased, for suitable concentrations. The transition occurs over a relatively narrow range of concentration or temperature. As the concentration is increased, the liquid-film spray at first remains generally angular in shape, has a relatively constant or slightly increased width that is characteristic of the width obtained when the composition is sprayed with no carbon dioxide, and has a relatively large average droplet size. A visible liquid film can typically be seen to recede towards the orifice. Atomization occurs predominately due to instability induced by shear with the surrounding air. The spray pattern is controlled predominately by the liquid forces. The boundary of the liquid-film region typically occurs about at the carbon dioxide concentration at which the liquid film disappears. As the concentration increases, the spray then passes through a transition region in which the spray pattern typically undergoes dramatic changes, which depend upon the composition, as it transforms from a liquid-film to a decompressive spray and the atomization mechanism changes. The shape and width of the transition spray typically changes markedly for relatively small changes in carbon dioxide concentration.

For some compositions, the spray pattern collapses from a flat fan into a narrower, irregular, conical spray and then expands into a wider, flat, parabolic decompressive spray. Sometimes the spray collapses completely into a single round jet, or into two, three, or more jets spaced at irregular angles, before expanding into a decompressive spray. For other compositions, the spray pattern remains mostly planar but the center flares outward. more as the spray narrows and then less as the spray expands into a decompressive spray. Sometimes the spray remains planar as a decompressive spray pattern forms superimposed upon the liquid-film spray pattern, which simultaneously disappears. For still other compositions, the angular spray pattern first becomes much wider and then changes to a parabolic shape.

The transition sprays are irregular and often unstable because neither the expansive force from the carbon dioxide nor the liquid forces of the composition dominate atomization and spray pattern formation, even though the atomization becomes substantially caused by the decompression of the carbon dioxide gas. The different types of spray transitions are due to different surface tension and Theological properties of different compositions.

A decompressive spray forms when the carbon dioxide concentration becomes high enough for the expansive force of the decompressing carbon dioxide to become dominate as the exit pressure increases. The decompressive spray that forms can be substantially planar if desired, is mostly parabolic in shape, but can be more angular than rounded near the orifice in some cases, and can be significantly wider than the corresponding liquid-film spray. Near the spray boundary, the decompressive spray may have some jetting or be somewhat flared at the center of the spray, and the spray pattern may be fingered. However, these typically dissipate and the spray pattern becomes more uniform at higher compressed fluid concentration.

The planar decompressive spray, in addition to being wider, is also typically thicker across the plane of the spray than the corresponding liquid-film spray. One of the characteristics of the transition from a liquid-film to a decompressive spray is a marked decrease in the average droplet size of the spray. U.S. Pat. No. 5,057,342 provides an example of the transition from a liquid-film to a decompressive spray in FIGS. 12a to 12d.

Generally the decompressive spray region occurs below but close to the solubility limit, thereby requiring a proper combination of spray temperature, pressure, and carbon dioxide concentration. The solubility limit and hence spray conditions required for a decompressive spray varies with composition. Spraying significantly inside the two-phase region is avoided for coating application, because a significant amount of organic solvent is typically extracted from the liquid polymer phase into the liquid carbon dioxide phase.

To reduce organic solvent emissions, water-borne coatings have been developed. However, as mentioned, water does not have a high evaporation rate, so often an insufficient amount of water evaporates from the spray. Decompressive sprays have been discovered to produce enhanced evaporation of water, even though very little evaporation occurs for slower evaporating solvents. Without wishing to be bound by theory, the high evaporation rate is believed to be caused by an exceptionally high mass transfer rate that occurs during formation of the decompressive spray due to the extremely rapid gasification of the dissolved compressed fluid. Fast and medium evaporating solvents are much more affected by these intense mass transfer conditions than slow evaporating solvents.

In paper manufacture, additive compositions are applied almost exclusively by using an aqueous solution, emulsion, or dispersion, with water being a viscosity reducer and volatile solvent. However, it is often not desirable to apply additives at the wet end of the paper making process, because the expensive additives are lost in the water drained from the wet paper web, which also creates a waste disposal problem, and additives applied at the wet end can interfere with the operation of the dryer, and the creper for tissue papers, which can cause loss of sheet control. Furthermore, it is difficult to control how some additives, such as surface treatments, are incorporated into the paper product when added at the wet end. Therefore, it is desirable to apply additives at the dry end, but the water applied with aqueous additive compositions is detrimental to the dried paper product. For example, increasing the moisture content above 7% can debond the paper and have a deleterious effect on caliper and tensile strength. For instance, a moisture content of 9% can decrease the tensile strength by as much as 15% in tissue papers. Aqueous compositions are also capable of penetrating the entire sheet, which causes the additive to spread to the inside rather than staying on the surface where it is often most effective. Because the air spray methods used to apply aqueous additive compositions require low viscosity for proper atomization, but evaporate little water in the spray, the additive composition is often deposited wetter on the paper web than is desirable. But, lowering the water content gives inadequate atomization. One method that has been disclosed to compensate for the excess water addition is to overdry and heat the paper web, but this consumes excess energy, and overdrying or overheating the web can be detrimental.

Airless atomization of viscous compositions, such as the hot melted, water-free, semi-solid or solid additive compositions, typically produces coarse atomization and a nonuniform spray pattern, which can give improper application on the surface which is sprayed. Heating the hot melt to a high temperature to further reduce viscosity can cause deterioration of the additive composition being sprayed. Therefore, using gravure coating or extrusion coating are disclosed as the preferred application methods for applying such compositions.

Similarly, in textile manufacture, it would be advantageous to be able to apply additive compositions, such as surface treatments, which are water-free, or are applied with less water than is possible with conventional spray methods. Such applications would allow the additive composition to be applied more efficiently and effectively without requiring post-addition drying.

In the manufacture of flexible sheet material products, e.g., plastic films, plastic laminate sheets, plastic-reinforced sheets, plastic impregnated sheets, rubber sheets, leather, fiber-reinforced sheets, porous sheets, screen sheet materials, extruded films, composite sheets, and composite laminate sheet materials, there is often a need to apply additives to the sheet material to modify or enhance sheet properties. But, using aqueous additive compositions is often ineffective, because the sheet material is incompatible with water due to hydrophobicity or poor wetting, or drying of the sheet material is prohibitive. Likewise, using volatile organic solvents is often undesirable due to flammability or degradation of the sheet product, such as by swelling or plasticization due to solvent absorption, or processing times are too short for adequate evaporation of the applied solvent. Therefore, it would be advantageous to be able to spray apply additive compositions to conveyed flexible sheet materials without using water or volatile organic solvents, or with a significant reduction in the applied amounts of the water and/or solvents.

Clearly, there is a need for improved methods for the spray application of additive compositions in the manufacture of sheet material products, such as paper, textile, and flexible sheet products which allow an additive composition to be applied water-free or with reduced applied water content, which do not require volatile organic solvents, which can reduce viscosity for atomization, and which can provide improved spray properties and droplet sizes for acceptable spray application. In addition to providing benefits over the existing application methods, such new technology would also permit the development and application of new additives which previously could not be spray applied, because they are insoluble, undispersible, or otherwise incompatible with water, or could not be adequately atomized by conventional spray methods without using volatile organic solvents.

SUMMARY OF THE INVENTION

By virtue of the present invention, methods have been discovered that can accomplish the above noted objectives. In accordance with the present invention, additive compositions can be sprayed onto sheet materials in the manufacture of sheet material products, such as paper, textile, and flexible sheet products, substantially free of water or volatile organic solvents, or both, with reduced viscosity for atomization, and with improved spray properties and droplet sizes for such spray applications. Improved sheet material products can be manufactured with more efficient and effective usage of expensive additive materials and with less generation of waste material.

The present invention provides methods for the spray application of an additive composition containing at least one additive material in the manufacture of sheet material products. In general, the methods comprise the steps of:

(1) forming a liquid mixture containing an additive composition and a compressed fluid in a closed pressurized system;

(2) spraying said liquid mixture through an orifice to form a spray; and (3) applying said spray containing said additive composition to the surface of said sheet material in the manufacture of said sheet material product.

In a preferred aspect of the invention, the method uses a decompressive spray of the compressed fluid which produces a uniform spray pattern and a narrow droplet size distribution that can improve application efficiency and quality when additive compositions are applied during the spraying step to rapidly conveyed sheet materials.

The present invention is also directed to a method for the spray application onto a flexible sheet material of an additive composition in the manufacture of a flexible sheet product wherein the additive composition is capable of at least adhering to, penetrating into, or being absorbed by the flexible sheet material.

DETAILED DESCRIPTION OF THE INVENTION

The present invention will be described in particular for the preparation of sheet material products from paper, textile and flexible sheet materials. A sheet material is a basically two-dimensional material that is thin in comparison to its length and breadth.

The additive composition that may be used in the present invention in the manufacture of a sheet material product generally contains at least one additive material that modifies or enhances the properties or performance of a product, or which is desired to be applied to the sheet material in the manufacture of a sheet material product. This, in general, includes any additive which is known to those skilled in the art which is suitable for spray application to a sheet material.

As used herein, the term "paper product" is understood to include any sheet material that contains paper fibers, which may also contain other materials. Suitable paper fibers include natural and synthetic fibers, for example, cellulosic fibers, wood fibers of all varieties used in papermaking, other plant fibers, such as cotton fibers, fibers derived from recycled paper; and the synthetic fibers, such as rayon, nylon, fiberglass, or polyolefin fibers. The paper product may be composed only of synthetic fibers. Natural fibers may be mixed with synthetic fibers. For instance, in the preparation of the paper product the paper web or paper material may be reinforced with synthetic fibers, such as nylon or fiberglass, or impregnated with nonfibrous materials, such as plastics, polymers, resins, or lotions. As used herein, the terms "paper web" and "web" are understood to include both forming and formed paper sheet materials, papers, and paper materials containing paper fibers. The paper product may be a coated, laminated, or composite paper material.

The present invention may be used in the preparation of paper products known to those skilled in the art. Such paper products include, but are not limited to, writing, printing papers, industrial papers, tissue papers of all varieties, paperboards, cardboards, packaging papers, wrapping papers, paper adhesive tapes, paper bags, paper cloths, toweling, wallpapers, carpet backings, paper filters, paper mats, decorative papers, disposable linens and garments, and the like.

The present invention has particular application in the preparation of tissue paper products known to those skilled in the art. Suitable tissue paper products include sanitary tissues, household tissues, industrial tissues, facial tissues, cosmetic tissues, soft tissues, absorbent tissues, medicated tissues, toilet papers, paper towels, paper napkins, paper cloths, paper linens, and the like. Common paper products include printing grade (newsprint, catalog, rotogravure, publication, banknote, document, bible, bond, ledger, stationery), industrial grade (bag, linerboard, corrugating medium, construction paper, greaseproof, glassine), and tissue grade (sanitary, toweling, condenser, wrapping).

Tissue paper may be a feltpressed tissue paper, a pattern densified tissue paper, or a high bulk, uncompacted tissue paper. The tissue paper may be creped or uncreped, of a homogeneous or multilayered construction, layered or non-layered (blended), and one-ply, two-ply, or three or more plies. Soft and absorbent paper tissue products are particularly important for consumer tissue products.

Paperboard is a paper that is thicker, heavier, and less flexible than conventional paper. Many hardwood and softwood tree species are used to produce paper pulp by mechanical and chemical processes that separate the fibers from the wood matrix.

Chemical additives and fillers are used to give desired physical, optical, or electrical properties to the paper product.

Continuous paper making machines have undergone extensive mechanical development. The cylinder machine uses a wire-covered cylinder mounted in a vat containing the fiber slurry. As the cylinder revolves, water drains inward through the screen and the paper web is formed on the outside. The wet web of paper fiber is removed at the top and passes through press rolls for water removal and into steam-heated cylindrical drying drums.

A Fourdrinier paper making machine is common and more complex. It produces virtually any grade of paper or paperboard from 1 to 10 meters in width. It consists of a long continuous wire screen that is supported by drainage devices. The fiber slurry or furnish enters at one end and loses water as it moves down the wire to form the sheet, which then passes to presses and dryers. Once the furnish is deposited on the forming wire, it is called a web. After stock preparation and dilution, a flow spreader discharges the paper furnish uniformly across the width of the paper machine into a headbox, where the proper pressure head discharges the slurry at the proper velocity through a slice onto the moving Fourdrinier wire. The wire is a finely woven, continuous belt-forming medium of plastic or metal construction. The wire is mounted over the breast roll at the intake end and over the couch roll at the discharge end. In between the breast and couch rolls the wire is supported by foils and suction boxes which remove water. Machine speeds vary due to limitations imposed by the paper products produced and the equipment used. Heavy paperboards require a long drying time and machine speeds are 50–250 m/min. Very dense papers are difficult to dewater and machine speeds range from 20 to 300 m/min. Brown grade paper products are produced at 200–1000 m/min. Newsprint producing machines operate at 800–1200 m/min. Drying capacity and paper product reeling constraints limit modern tissue machine speeds to 1500–1800 m/min with most operating at lower speeds, but some operate up to 2000 m/min.

Virtually all new paper producing machines are twin-wire formers because they give more stable high speed operation and better control of forming and dewatering conditions. The water is drained from the slurry by pressure instead of vacuum. Many large Fourdrinier wet ends have been retrofitted with top wire units to achieve similar advantages under high speed operation, particularly for preparing light weight paper product sheets (tissue, towel, newsprint). Twin-wire formers are also used for fine paper, corrugated media, and linerboard grade products. The two wires, with the slurry in between, are wrapped around a cylinder or a set of support bars or foils. The tension in the outer wire transmits pressure through the slurry to the support structure. The pressurized slurry drains through one or both of the wires. In a typical roll-type twin-wire paper tissue former, drainage is single sided and limited to low basis weight which is sufficient for drainage at very high speeds above 2100 m/min for thin tissues.

The forming units receive the incoming slurry at a low consistency, typically 100–300 kg-water/kg-solids, and the paper web leaving the couch roll has about 4 kg-water/kg-solids. More water is removed by using one or more rotary presses, which is much less expensive than using heat. The paper sheet passes through the presses on continuous felts, which are conveyors and porous water receptors. The water content of the paper sheet can be reduced by pressing it to about 1.2–1.9 parts water per part fiber. Evaporative drying must be used for final water removal, which is costly and can limit production. The dryer section commonly is a series of steam-heated cylinders. The sheet is usually held against the dryer surface by fabrics. The final moisture content of the dry paper sheet is usually 4 to 10 percent by weight. The dried sheet is calendered through a series of roll nips, to reduce thickness and smooth the surface, and then wound onto a reel.

A variety of wet-laid felts and nonwoven fabrics are also produced on Fourdrinier-type paper machines. Noncellulosic materials, such as synthetic fibers, may be included as part or all of the fiber furnish; latexes, water-soluble polymers, or other adhesives are used as bonding agents. Synthetic fibers can make paper highly resistant to wetting, chemical attack, mechanical wear (folding), weathering, and biological degradation.

Chemical agents can be added to the pulp slurry before paper sheet formation (internal or wet-end addition), or to the formed sheet after complete or partial drying (surface or dry-end addition). If the additive is not satisfactorily retained on or in the sheet from a dilute pulp slurry, it is best applied to the sheet surface. Process additives improve the operation of the paper making machine. Functional additives enhance the properties of the paper product, such as fillers, rosin or starch sizing agents, dyes and brighteners, wet-strength resins, dry-strength additives, pigment coatings to provide a smooth surface for printing, and polymers for mechanical or barrier properties. Many machine modifications and auxiliary operations are used for certain types of papers or special grades of paper. Many paper making machines incorporate surface sizing, surface coating, and special calendering treatments capabilities.

The wet strength of paper can be augmented by natural and synthetic polymers whose hydrogen, ionic, or covalent bonding abilities when the paper is wet enhance the hydrogen bonding between the cellulose fibers that is disrupted by the water. Papers such as tissue, toweling, linerboard, carrierboard, and bleached carton require wet strength to function, which generally is provided by the addition of resin materials. The main wet-strength resins used are aminopolyamide-epichlorohydrin resins, which are desirable for tissue and toweling.

Although many functional chemicals can be added to the wet end of the paper machine, some grades of paper are unsatisfactory with the low levels of wet-end additives that are retained in the sheet. They require that special chemicals be applied to the surface of the preformed paper web in order that they perform satisfactorily.

Paper tissue covers a wide range of low-weight sheets. Sanitary or household tissue paper products include facial tissue, bathroom tissue, toilet paper, cosmetic tissue, pocket tissue, paper towels, kitchen towels, and paper napkins. Their primary features are softness and absorbency. Toweling is a creped absorbent paper having fast absorbency, water holding capacity, and wet strength. Industrial paper tissue includes condenser, carbonizing, and wrapping grades.

Because of the very low basis weights for some paper tissue products and the loose structure of others, tissues generally are not produced on a conventional paper machine. Various tissue machine designs are utilized but the traditional arrangement uses a Fourdrinier forming section and a so-called "Yankee dryer". Twin-wire formers for high-speed tissue machines are gap roll formers where the drainage zone has a "C" or "S" shaped configuration. An important feature of all paper tissue-forming machines is that the wet web is supported throughout the forming, pressing, and drying processes. Tension is not applied to the sheet until it is dried. The Yankee dryer is a large-diameter steam-heated cylinder that dries the sheet from one side only. The wet sheet is pressed tightly against the highly-polished surface. The drier is enclosed by an air hood and may employ high velocity air impingement to increase drying capacity. Percolation through drying which draws hot air through the sheet may be used for high quality tissue products. The sheet may or may not be calendered prior to reeling. Certain grades are calendered off-machine on a supercalender.

Sanitary tissues are usually creped as they leave the dryer to increase water absorbency and softness. Creping ruptures fiber-to-fiber bonds within the web to increase bulk. Mechanical creping is done by peeling the sheet from the steel drier roll with a sharpened doctor blade, which is maintained at an angle to the surface of the roll. The quality of the creped sheet is partly a function of its adhesion/release properties, which are determined by the dryer surface coating.

Textile products include clothing and apparel, household textiles, such as sheets, towels, upholstery, carpeting, drapery, and wall covering, and textiles that serve a variety of industrial functions, such as tire reinforcement, tenting, filter media, conveyor belts, insulation, and reinforcement media in various composite materials.

Textiles are manufactured from staple fibers (finite lengths) and filaments (continuous lengths) by a variety of processes to form woven, knitted, and nonwoven, or felt-like fabrics. The textile products may be woven or non-woven products. In woven and knitted fabrics, the fibers and filaments are formed into continuous-length yarns, which are then either interlaced by weaving or interlooped by knitting into planar, flexible, sheet-like structures known as fabrics. Nonwoven fabrics are formed directly from fibers and filaments by chemically or physically bonding or interlocking fibers that have been arranged in a planar configuration.

Textile fibers may be classified according to their origin: naturally occurring fibers based on cellulose (cotton, linen, hemp, jute, ramie, wood), or proteins (wool, mohair, vicuna, silk); manufactured fibers based on cellulose or protein derivatives (rayon, lyocell, acetate, triacetate, azlon); synthetic organic polymers (acrylic, aramid, nylon, olefin, polyester, spandex, vinyon, vinal or vinylon, carbon/graphite, and specialty fibers); or inorganic materials (glass).

Textile finishing includes various efforts to improve the properties of textile products, whether for apparel, home, or other end uses. These processes modify either the fiber characteristics or the gross textile end properties. Such modifications may be chemical or mechanical in nature. Examples of such properties are shrinkage control, smooth-dry performance, flame retardance, soil release, smolder resistance, weather resistance, or control of static charges.

The additive composition that may be used with the present invention in the manufacture of textile products generally contains at least one additive material that modifies or enhances the properties or performance of a textile product or which is desired to be applied to a textile material in the manufacture of a textile product.

As used herein, the term "textile product" is understood to include any sheet material that contains textile fibers, but it is not limited to textile fibers and may also contain other materials. Suitable textile fibers in general include those fibers known to those skilled in the art, which include, but are not limited to, cellulose fibers, such as cotton and linen; protein fibers, such as wool; cellulose or protein derivative fibers, such as rayon and acetate; synthetic organic polymer fibers, such as acrylic, aramid, nylon, olefin, and polyester; inorganic fibers, such as glass fiber; and the like. The fibers may be staple fibers or filaments and may be in the form of individual fibers or filaments, or as yarns or threads. The textile product may be woven or nonwoven, knitted, felted, knotted, bonded, or crocheted. It may have a variety of textures, finish weights, widths, and thicknesses. Suitable textile products include, but are not limited to, cloths, fabrics, household textiles, industrial textiles, clothing, garments, linens, sheets, towels, bandages, upholstery, carpeting, draperies, wall coverings, insulation, mats, cloth adhesive tapes, and the like. The textile products may be a coated, impregnated, laminated, or composite material. It may be homogeneous or have a multi-layered construction.

It is understood that the present invention may also be used in manufacture of products which may be considered to be both a paper product and a textile product because they contain both paper fibers and textile fibers. Such products include, but are not limited to, dryer sheets for softeners, surgical garments, industrial coveralls, duct tape, adhesive strips, and other composite fibrous materials and products.

The flexible sheet material which may be treated according to the present invention include plastic films, plastic laminate sheets, plastic-reinforced sheets, plastic impregnated sheets, rubber sheets, leather, fiber-reinforced sheets, porous sheets, screen sheet materials, extruded films, composite sheets, and composite laminate sheet materials. Suitable plastic films include polyolefin films, such as polyethylene and polypropylene, cellophane film, cellulose acetate film, and adhesive plastic films and tapes. A flexible sheet is a sheet that is capable of being bent or flexed, such as when being conveyed or wound on a roll. The flexible sheet may be porous or a continuous film or sheet. It may be coated, impregnated, laminated, or a composite material. It may be homogeneous or multi-layered.

The additive composition used with the present invention in the manufacture of flexible sheet products generally contains at least one additive material which is capable of at least adhering to, penetrating, or being absorbed by a flexible sheet material and which modifies or enhances the properties or performance of the resulting flexible sheet product, or which is desired to be applied to a flexible sheet material in the manufacture of a flexible sheet product.

As used herein, it will be understood that a "compressed fluid" is a fluid which may be in its gaseous state, its liquid state, or a combination thereof, or is a supercritical fluid, depending upon (i) the particular temperature and pressure to which it is subjected, (ii) the vapor pressure of the fluid at that particular temperature, and (iii) the critical temperature and critical pressure of the fluid, but which is in its gaseous state at standard conditions of 0° Celsius temperature and one atmosphere absolute pressure (STP). As used herein, a "supercritical fluid" is a fluid that is at a temperature and pressure such that it is at, above, or slightly below its critical point.

Compounds which may be used as a compressed fluid in the present invention include, but are not limited to, carbon dioxide, nitrous oxide, ammonia, xenon, ethane, ethylene, propane, propylene, butane, isobutane, and mixtures thereof. Preferably, the compressed fluid is or can be made environmentally compatible or can be readily recovered from the spray environment. The utility of any of the above-mentioned compressed fluids in the practice of the present invention will depend upon the composition used, the temperature and pressure of application, and the inertness and stability of the compressed fluid. Nitrous oxide should be used only under safe and stable conditions. Due to environmental compatibility and low toxicity, carbon dioxide and ethane are preferred compressed fluids. Due to low cost, non-flammability, and wide availability, carbon dioxide is generally the most preferred compressed fluid. However, use of any of the aforementioned compressed fluids and mixtures thereof are to be considered within the scope of the present invention.

As used herein, the phrases "additive composition", "additive material", "water-borne additive composition" and "water-borne composition" are understood to mean compositions and materials that have no compressed fluid admixed therewith. An additive composition generally contains more than one additive material. As used herein, the term "additive material" is understood to mean a chemical or component or mixtures thereof that is applied to a sheet material. As used herein, the term "sheet material product" is understood to mean a sheet material, to which an additive composition has been applied.

As used herein, the term "manufacture" is understood to include the making, production, formation, or fabrication of a sheet material product, as well as the changing, manipulation, conversion, alteration and modification of the sheet material.

As used herein, the term "solvent" is understood to mean conventional solvents, including water, that have no compressed fluid admixed therewith, and which are in the liquid state at conditions of about 25° C. temperature and one atmosphere absolute pressure.

The methods of the present invention may be used for the spray application of an additive composition containing at least one additive material in the manufacture of a paper product, such as a tissue paper product, or in the manufacture of a textile product, or a flexible sheet product.

The additive materials in the additive composition that may be applied by the methods of the present invention include a wide variety of additives that perform a variety of functions or provide a wide variety of properties to the sheet material treated. Additive materials in the additive composition which impart certain properties or characteristics to the sheet materials treated according to the present invention include, but are not limited to, at least one softener, emollient, lubricant, moisturizer, lotion, cream, conditioner, absorbant, hydrophilizer, debonder, adhesive, coating, soap, sunscreen, surfactant, oil, wax, polymer, rosin, resin, oleoresin, colorant, dye, brightener, opacifier, ultra-violet light absorber, flame retardant, anti-oxidant, vitamin, fragrance, perfume, deodorant, antibacterial agent, antimicrobial agent, disinfectant, pharmaceutical, astringent, adhesion promoter, bonding agent, antistatic agent, crosslinking agent, plasticizer, curing agent, preservative, protectant, humectant, stabilizer, inhibitor, modifier, chemical agent, and the like. The additive may be a product additive or a processing additive.

A softener is an additive material that imparts a perceived softness to the product. Softener additives include a variety of silicones, oils, waxes, fatty alcohols, and other materials. An emollient is an additive material that softens, soothes, supples, coats, lubricates, moisturizes, or cleans the skin. Emollient additives include a variety of oils, waxes, and fatty alcohols. A hydrophilizer is an additive material that increases water absorbency, such as polyhydroxy compounds. Examples of such additive materials and the properties they impart to the treated sheet material include fatty alcohols (lubricity, body, opacity), fatty esters (lubricity, feel modification), dimethicone (skin protection), powders (lubricity, oil absorption, skin protection), preservatives and antioxidants (product integrity), ethoxylated fatty alcohols (wetability, process aids), fragrance (consumer appeal), and lanolin derivatives (skin moisturization).

Additional additive materials that may be used in the practice of the present invention for a variety of purposes include, but are not limited to, silicones and silicone oils, such as dimethicone and alkylmethyl silicones; petroleum-based oils including mineral oil and petrolatum; animal oils, such as mink oil and lanolin; derivatized lanolin and synthetic lanolin; plant oils, such as aloe extract, sunflower oil, and avocado oil; natural waxes, such as beeswax and carnauba wax; petroleum waxes, such as paraffin and ceresine wax; silicone waxes, such as alkyl methyl siloxanes; synthetic waxes, such as synthetic beeswax and synthetic sperm wax; tallow; fatty alcohols such as alcohols having a carbon chain length of $C_{14}$–$C_{30}$, including cetyl alcohol, stearyl alcohol, behenyl alcohol, and dodecyl alcohol; alkyl ethoxylates such as $C_{12}$–$C_{18}$ fatty alcohol ethyoxylates with 3 to 30 oxyethylene units; fatty acid esters including methyl palmitate, methyl stearate, isopropyl laurate, isopropyl myristate, isopropyl palmitate, ethylhexyl palmitate, lauryl lactate, and cetyl lactate; fatty alcohol ethers, such as cetyl glycol and propoxylated fatty alcohols; polyhydroxy fatty acid esters including sorbitan palmitates, sorbitan stearates, sorbitan behenates, glyceryl monostearate, glyceryl monopalmitate, glyceryl monobehenate, sucrose monostearate, and sucrose monolaurate; glycerides, acetoglycerides, and ethoxylated glycerides; phospholipids such as lecithin; polyhydroxy compounds, such as propylene glycol, glycerine, ethoxylated glycerine, polyglycerols, polyethylene glycol, polypropylene glycol, and polyethylene/propylene glycol copolymers; silicone glycols; polymers and copolymers, such as acrylics, cellulosics, polyesters, and vinyls; quaternary ammonium compounds, such as monoalkyl trimethyl quaternary amines, benzyl quaternary amines, monomethyl triakyl quaternary amines, imidazolinium quaternary amines, silicone quaternary amines, fatty acid quaternaries, quaternized protein compounds, and quaternized lanolin derivatives; and surfactants, including nonionic surfactants such as nonionic alkylglycosides, and ampholytic, zwitterionic, anionic, and cationic surfactants; cellulose derivatives; proteins; and fluorinated compounds and materials.

Silicone has been widely used as an additive in the treatment of sheet materials to enhance the sheet material's properties and characteristics. Silicone, also known as organopolysiloxane, polyorganosiloxane, polydiorganosiloxane, or simply as polysiloxane, is any of a large group of siloxane polymers or oligomers based on a structure consisting of alternate silicon and oxygen atoms with various organic radicals, hydrogen, or other radical substituent side groups attached to the silicon. Different properties are achieved by the attachment of selected chemical functional groups to the silicone backbone. Silicones may be liquids, semisolids, or solids depending on the molecular weight, degree of polymerization, and substituent radical groups. They may be in the form of fluids, powders, emulsions, solutions, resins, and pastes. Silicones are usually hydrophobic and can be obtained as neat fluids, organic solvent solutions, or as water emulsions. These emulsions can have a positive, neutral, or negative charge. Liquid silicones are sometimes referred to as silicone oil. The silicone may have a straight chain, branched chain, or a cyclic structure, and may be crosslinked. The radical side groups may each independently be hydrogen or any alkyl, aryl, alkenyl, alkaryl, arakyl, cycloalkyl, halogenated hydrocarbon, or other radical. Any of such radicals may be substituted or unsubstituted. The radicals of any particular monomeric unit may differ from the corresponding functionalities of the next adjoining monomeric unit. The radicals may independently be other silaceous functionalities such as siloxanes, polysiloxanes, silanes, and polysilanes. The radicals may contain any of a variety of organic functionalities, including alcohol, carboxylic acid, aldehyde, ketone, ester, ether, polyether such as oxyethylene or oxypropylene groups, amine, and amide functionalities. One commonly used type of silicone is polydimethylsiloxane, which may have a hydrogen bonding functional group such as amino, carboxyl, hydroxyl, ether, polyether, aldehyde, ketone, amide, ester, and thiol groups, with the functional group substitution generally being less than about 20 molar percent and often less than about 10 molar percent.

Silicones may also comprise copolymeric and other multiple-monomeric siloxane materials, such as an ethylene oxide-dimethyl siloxane copolymer, which can act as a coupling agent. Mixture of silicones may also be used, such as mixtures of functional and nonfunctional silicones, for example, mixtures of polydimethylsiloxanes and alkylene oxide-modified polydimethylsiloxanes. The silicone may also be used in a mixture with other additive materials, such as mineral oil. A liquid silicone or any other liquid additive material may be used as a nonvolatile solvent to dissolve or disperse other semisolid or solid additive materials for application.

The intrinsic viscosity of the silicone may vary widely so long as it is flowable or can be made flowable for spray application. This includes viscosities of about 25 centipoise to about 50,000 centipoise or higher. Preferably the viscosity is from about 100 to about 5000 centipoise, particularly if the silicone is applied in neat form, more preferably from about 200 to about 2000 centipoise. Semisolid or solid silicones may be heated and melted for application. If desired, high viscosity silicones which are themselves resistant to flowing can be applied by such methods as emulsifying the polysiloxane in water with a suitable surfactant or dissolving it in a volatile solvent such as hexane. The high viscosity silicone may also be dissolved, emulsified, or dispersed in another liquid additive material.

For instance, one means of improving the feel of paper tissue products is to incorporate a silicone additive into the sheet material of tissue paper. Silicones are known to provide a desirable smooth or silky feeling to the surface of the tissue and thereby improve perceived softness. The silicone may be applied to the tissue web at some point after it is formed, either before or after drying. Silicones are also used to an appreciable extent for finishing and improving textiles. They act as softeners, hydrophobizing agents, sizing agents, and improve handle. Linear polysiloxanes containing polyether groups improve the handle and wetting. Silicone compounds with quaternary ammonium groups can reduce the static charge. Silicones are also active at the surface of plastic and synthetic fibers.

If desired, at least one additive material in the additive composition may be dissolved, emulsified, or dispersed in one or more volatile solvents. Suitable volatile solvents include, but are not limited to, water; alcohols, such as methanol, ethanol, propanol, butanol, and other aliphatic alcohols; ketones, such as acetone, methyl ethyl ketone, methyl isobutyl ketone, methyl amyl ketone, and other aliphatic ketones; esters, such as methyl acetate, ethyl acetate, and other alkyl carboxylic esters; ethers, such as methyl t-butyl ether, dibutyl ether, and other aliphatic or alkyl aromatic ethers; glycol ethers, such as ethoxy ethanol, butoxy ethanol, ethoxy 2-propanol, and propoxy ethanol; glycol ether esters such as butoxy ethoxy acetate and ethyl 3-ethoxy propionate; alkane hydrocarbons, such as hexane, heptane, naphtha, and mineral spirits; and aromatic hydrocarbons, such as toluene and xylene; and the like. Preferably, the additive composition contains only a small proportion of volatile solvent which is present only in amounts sufficient to liquify additives to make them flowable for application to the sheet material being treated. More preferably, the additive composition is substantially free of a volatile solvent or water or both. As used herein, the term "substantially free" means less than about 5 weight percent, preferably less than about 2 weight percent and more preferably less than about 1 weight percent based on the total weight of the additive composition.

For spraying, the additive composition, whether it is to be applied to a sheet material in the manufacture of a paper product, a textile product, or a flexible sheet product, is admixed with a compressed fluid to form a liquid mixture in a closed pressurized system. The additive composition may be either a liquid, a semi-solid, or a solid before being mixed with the compressed fluid, provided that it forms a liquid mixture when admixed with the compressed fluid under pressure and is capable of being sprayed. If the additive composition is liquid, it may be a liquid solution, emulsion, dispersion, or suspension. The additive composition may be heated prior to being mixed with the compressed fluid, such as to melt or liquid semi-solid or solid compositions for admixing. The liquid mixture formed by admixture with the compressed fluid may be a liquid solution, emulsion, dispersion, or suspension. The compressed fluid may be dissolved or finely dispersed as a gas, liquid, or supercritical fluid phase in the liquid mixture. Preferably, the compressed fluid is at least partially dissolved or finely dispersed as a liquid phase in the additive composition.

The liquid mixture of additive composition and compressed fluid contains compressed fluid in an amount which renders the liquid mixture capable of being sprayed. In general, the amount of compressed fluid used will be at least about 5% by weight, based upon the total weight of compressed fluid and additive composition, preferably at least about 10%, more preferably at least about 15%, still more preferably at least about 20%, and most preferably at least about 25%. The amount of compressed fluid used will depend on the compressed fluid used, the additive composition, and the temperature and pressure used for spraying. The amount of compressed fluid may exceed its solubility limit in the additive composition, if desired, but it should not be so excessively high that the excess compressed fluid phase unduly interferes with spray formation, such as by not remaining well dispersed in the liquid mixture or providing poor atomization. Using excess compressed fluid can sometimes be advantageous to reduce the rate at which the additive composition is sprayed, particularly in the use of an additive composition which contain no volatile organic solvent. In general, the amount of compressed fluid in the liquid mixture will be less than 80% by weight, preferably less than 70%, and more preferably less than about 60%. Frequently the liquid mixture will contain from about 25% to about 50% compressed fluid.

The liquid mixture of additive composition and compressed fluid preferably has a spray viscosity below about 300 centipoise at the spray temperature and pressure, more preferably below about 150 centipoise, still more preferably below about 100 centipoise, and most preferably below about 50 centipoise.

The liquid mixture of additive composition and compressed fluid may be prepared for spraying in any of the spray apparatus disclosed in the aforementioned patents, or other suitable apparatus. The spray apparatus may also be a UNICARB® System Supply Unit manufactured by Nordson Corporation to proportion, mix, heat, and pressurize coating compositions with compressed fluids, such as carbon dioxide for the spray application of coatings.

For mixing with the additive composition, particularly compositions containing dissolved solid additives, the compressed fluid may be heated and the pressure regulated to prevent precipitation of solids during mixing, such as by the methods disclosed in U.S. Pat. No. 5,312,862.

The liquid mixture is sprayed by passing the mixture under pressure through an orifice of the spraying equipment to form a spray. Although high spray pressures of 5000 psig and higher may be used, preferably the spray pressure of the liquid mixture is below about 3000 psig, more preferably below about 2500 psig. Very low pressure is generally not favorable for proper atomization. Preferably, the spray pressure is above about 500 psig, more preferably above about 800 psig, still more preferably above about 1000 psig, and most preferably above about 1200 psig. The pressure used will depend upon the compressed fluid that is used, its amount in the liquid mixture, and upon the properties of the additive composition.

The spray temperature of the liquid mixture is preferably below about 150° C., more preferably below about 100° C., and most preferably below about 80° C. The temperature that may be utilized will in general depend upon the characteristics of the additive composition, such as stability and heat sensitivity. Preferably, the spray temperature of the liquid mixture is above about 25° C., more preferably above about 30° C., still more preferably above about 40° C., and most preferably above about 50° C.

Spray orifices, spray tips, spray nozzles, and spray guns used for conventional and electrostatic airless and air-assisted airless spraying are generally suitable for spraying the liquid mixtures of the present invention. Spray guns, nozzles, and tips which are preferred do not have excessive flow volume between the orifice and the valve that turns the spray on and off, and do not obstruct the wide angle at which the spray typically exits the spray orifice. The most preferred spray tips and spray guns are the UNICARB® spray tips and spray guns manufactured by Nordson Corporation or Graco Corporation. Orifice sizes of from about 0.007-inch to about 0.025-inch nominal diameter are preferred, although smaller and larger orifice sizes may be used. The orifice size is chosen to give the desired application rate of the additive composition for the given spray width. Devices and flow designs, such as pre-orifices or turbulence promoters, that promote turbulent or agitated flow in the liquid mixture prior to passing the mixture through the orifice may also be used. The pre-orifice preferably does not create an excessively large pressure drop in the flow of the liquid mixture. The pre-orifice can be used to adjust the spray properties and the spray rate.

The spray pattern may be a circular spray such as is produced from a round orifice, or it may be an oval or flat spray as produced by a groove cut through the orifice, as aforementioned. A wider, feathered, flat spray fan is generally preferred. For producing an axisymmetric spray pattern, a favored spray tip design has two intersecting grooves cut through the orifice outlet at right angles to each other. This produces two intersecting spray fans which merge to produce an axisymmetric spray pattern.

In the practice of the present invention, the liquid mixture is preferably sprayed under conditions of compressed fluid concentration in the liquid mixture, spray temperature, and spray pressure that produce a decompressive or substantially decompressive spray, hereinafter referred to in the specification and claims as a "decompressive spray". Such conditions will vary with the additive composition, compressed fluid, and spray tip used, so they generally must be determined experimentally. Frequently spraying is done at the solubility limit, or just below or above it. A sufficiently high spray pressure is used to obtain a sufficiently high solubility. The spray temperature and compressed fluid concentration are then adjusted to give a decompressive spray having the desired characteristics for a particular application, such as desired droplet size. When the compressed fluid concentration exceeds the solubility limit, the excess compressed fluid phase is preferably well dispersed in the liquid mixture. Preferably the excess compressed fluid phase is a finely dispersed liquid phase.

Preferably the compressed fluid is a supercritical fluid at the temperature and pressure at which the liquid mixture is sprayed.

To spray an additive composition with enhanced atomization, the liquid mixture of the additive composition and compressed fluid desirably contains the compressed fluid in an amount that enables the liquid mixture to form a liquid compressed fluid phase at the spray temperature used. The spray pressure is desirably above the minimum pressure at which the liquid mixture forms a liquid compressed fluid phase at the spray temperature used. This technique is disclosed in U. S. Pat. No. 5,290,603.

The gaseous environment in which the spray is formed in the present invention is not critical. However, the pressure therein must be substantially lower than the spray pressure in order to obtain sufficient decompression of the compressed fluid to form a decompressive spray. Preferably, the gaseous environment is at or near atmospheric pressure. The environment will generally comprise air, but other gaseous environments may also be used. If the additive composition contains water, preferably the humidity is suitably low for water evaporation from the spray.

Spray droplets are produced which generally have an average diameter of one micron or greater. Preferably, the droplets have average diameters of about 5 to about 150 microns, more preferably from about 10 to about 100 microns, still more preferably from about 15 to about 70 microns, and most preferably from about 20 to about 50 microns.

The decompressive spray can produce uniform atomization that has a relatively narrow droplet size distribution, which is desirable for efficient and effective application of the additive composition, to the sheet material to be treated, particularly when applied to a sheet material that is being rapidly conveyed in the manufacturing apparatus. Not only can the droplet size distribution be narrow at a point in the spray, but the average droplet size can be very uniform across the spray pattern, which gives a narrow overall droplet size distribution for the entire spray so that some regions are not over-atomized or under-atomized. Nonuniform atomization across the spray pattern is frequently a problem with air and airless spray methods. The narrowness of a droplet size distribution can be given by its span. The span is defined as $(D_{0.9}-D_{0.1})/D_{0.5}$, where $D_{0.5}$ is the size for which 50% of the droplet volume has smaller (or larger) size and equals the average droplet size, $D_{0.1}$ is the size for which 10% of the droplet volume has smaller size, and $D_{0.9}$ is the size for which 10% of the droplet volume has larger size. Preferably, the droplet size distribution has a span less than about 2.0, more preferably less than about 1.8, still more preferably less than about 1.6, and most preferably less than about 1.4. A narrower span has a smaller percentage of particles that may be too small or too large for a given application. The desirable span will vary with the application.

We have discovered that the narrow droplet size distribution that can be produced by the decompressive spray is advantageous for the spray application of additive compositions to rapidly conveyed sheet substrates in the manufacture of paper, textile, and flexible sheet products, particularly when combined with the favorable spray velocity characteristics. A difficult problem that leads to poor application efficiency of air sprays, when applied to a rapidly conveyed sheet, is the formation of an air boundary layer along the sheet surface, particularly at high speeds. A large proportion of the droplets produced by air sprays are too small to penetrate the air boundary layer, so they are swept away in the air flow and become overspray. This problem is made worse by air sprays being highly turbulent. But using an air spray with a larger average droplet size produces a high proportion of overly large droplets, which produce a poor quality application and therefore can not be tolerated.

In contrast, because the decompressive spray produces a narrow droplet size distribution, a higher average droplet size can be used without increasing the proportion of overly large droplets. In addition, the decompressive spray is significantly less turbulent than an air spray. Therefore, the additive composition can be applied with high efficiency, which reduces waste generation and application cost. For example, in a direct spray comparison, a decompressive spray with an average droplet size of 35 microns produced the same proportion of overly large droplets (2% by volume) as a comparable air spray with an average droplet size of 20 microns. Therefore the decompressive spray would be able to apply the additive composition with much higher application efficiency. Furthermore, the composition sprayed with the decompressive spray has a viscosity of 2000 centipoise, whereas to be sprayed by the air spray in the absence of using a decompressive spray, the composition has to be diluted with volatile solvent to a viscosity of 100 centipoise.

We have also discovered that in addition to improved application efficiency, the decompressive spray can give improved application quality of the additive composition and therefore can provide improved products. The uniform atomization and spray patterns can provide a more uniform deposition and distribution of the additive composition on the conveyed sheet material. Furthermore, on microporous sheets, such as papers and textiles, we have discovered that the spray deposition can be nonpenetrating into the interior of the sheet, if desired. The additive composition penetrates the air boundary layer, but does not penetrate the paper matrix itself, so the additive composition remains on the surface of the paper. This is desirable for many surface treatments, such as the application of softeners, lubricants, and lotions, because the additive composition is utilized more effectively.

Furthermore, additive composition penetration into the interior of a paper can cause undesirable debonding and weakening of the cohesiveness and tensile strength of the sheet material. The lower turbulence level and generally softer spray that can be produced by the decompressive spray also applies less stress to delicate paper than do air sprays, so mechanical integrity is less likely to be disrupted. As mentioned, the ability to spray viscous additive compositions that are substantially free of water or volatile solvent can also provide superior application and product quality, such a providing less absorption or migration into the interior of the sheet and results in a smoother, softer surface to the sheet material's surface, such as paper tissues with less reduction in caliper.

The present invention may also be used to apply a drier water-borne additive composition in the manufacture of a paper product or a textile product by using a decompressive spray. For some applications, it may be necessary to utilize water as a solvent, but it may be desirable to be able to deliver a drier additive composition to the paper or textile material. Because the decompressive spray is able to atomize higher viscosity water-borne additive compositions than is possible with air sprays, the water content of the water-borne additive composition can often be significantly reduced. Furthermore, a decompressive spray has been discovered to produce enhanced evaporation of water in the spray, so even water-borne additive compositions which have a conventional water content can be applied drier to a paper or textile sheet material. As disclosed in mentioned U.S. Pat. No. 5,716,558, water-borne compositions have even been spray-dried in ambient air within a short distance of the spray orifice. Therefore, by the methods of the present invention it is possible for water-borne additive compositions to be deposited substantially dry onto a paper or textile sheet material.

For spraying, the water-borne additive composition, which contains water and at least one additive material which can be dissolved, emulsified, or dispersed in water, and which may contain other ingredients, such as a suitable surfactant, is admixed with the compressed fluid, preferably carbon dioxide or ethane, to form a liquid mixture in a closed pressurized system. The compressed fluid may be present in the liquid mixture as a solution, emulsion, or a gaseous or liquid dispersion, preferably emulsified or finely dispersed. We have surprisingly discovered that even though the compressed fluid may have little solubility in the water-borne additive composition, by using an emulsified or dispersed compressed fluid phase in the liquid mixture, the spray can undergo a transition from a liquid-film spray to a decompressive spray, as the compressed fluid level is increased or temperature is increased, in a manner similar to that for water-free compositions having significant compressed fluid solubility. Coupling solvents, such as ethylene glycol ethers, propylene glycol ethers, and the like, or other coupling materials, may be used to increase solubility of the compressed fluid in the water-borne additive composition, as disclosed in U. S. Pat. No. 5,419,487.

Although viscosities higher than about 2000 centipoise may be used if a decompressive spray is formed, the water-borne additive composition will generally have a viscosity below about 2000 centipoise at a temperature of 25° C., preferably below about 1500 centipoise, more preferably below about 1000 centipoise, and most preferably below about 700 centipoise.

The amount of compressed fluid that is used in the liquid mixture in the water-borne additive composition should be such that the compressed fluid phase remains substantially finely dispersed in the liquid mixture and gives proper atomization. Preferably the compressed fluid phase is rendered into a finely dispersed liquid phase at supercritical temperature and pressure after being admixed with a water-borne additive composition. The composition may contain an organic solvent or another component which is miscible with the compressed fluid, thereby enabling the compressed fluid to form the liquid phase. If the amount of compressed fluid is excessively high, larger than desirable agglomerations of the compressed fluid can form in the liquid mixture, which can become more difficult to maintain as a uniform dispersion. Therefore, although larger quantities may be used, the amount of compressed fluid present in the liquid mixture is preferably less than about 40% by weight, more preferably less than about 35%, still more preferably less than about 30%, and most preferably less than about 25%. The amount of compressed fluid present in the liquid mixture is at least an amount which renders the liquid mixture capable of forming a decompressive spray. The amount required will depend upon the viscosity and rheological properties of the water-borne additive composition. The liquid mixture preferably contains at least about 4 percent compressed fluid, more preferably at least about 6 percent compressed fluid, still more preferably at least about 10 percent compressed fluid, and most preferably at least about 15 percent compressed fluid.

The liquid mixture in the water-borne additive composition is preferably sprayed at a temperature above about 40° C., more preferably above about 50° C., and most preferably above about 55° C., and at a pressure, preferably above about 1200 psig, more preferably above about 1400 psig, that gives a decompressive spray by passing the mixture through an orifice into an environment suitable for water evaporation, preferably having a low humidity level. One or more dry gas jets, such as assist gas, which may be heated, may be applied to the decompressive spray to increase the rate of turbulent mixing or temperature within the spray or both, in order to increase the evaporation rate of the water. When carbon dioxide is the compressed fluid used with a water-borne additive composition that is sensitive to a lowered pH level, particularly to acidic pH levels, the pH of the liquid mixture may be controlled to prevent precipitation when the carbon dioxide is admixed with the additive material. Preferably, the pH is controlled by using a pH buffer, such as a carbonate/bicarbonate buffer, which regulates the pH at about 10. The pH may also be controlled by using alkali or other basic materials, such as ammonia, sodium hydroxide, calcium carbonate, and other salts.

The present invention may be carried out in any commercial paper, textile, or flexible sheet material manufacturing system, including converting systems, known to those skilled in the art, including the aforementioned types of papermaking machines. The additive composition may be applied to the sheet material without significantly impacting on machine operability, including operation rate. The additive composition may be applied from the spray either directly or indirectly at any point in the manufacture of tile paper, textile, or flexible sheet products. The conveyed paper, textile, or flexible sheet material may be unsupported or supported during the spray application by means known to those skilled in the art. The additive composition may be applied as the paper, textile, or flexible sheet material is conveyed from one roll to another roll. The additive composition may also be applied to the sheet material during other operations.

Indirect application methods that may be used in the present invention include, but are not limited to, applying the additive composition from the spray to at least one transfer surface from which the additive composition is ultimately transferred by contact to the conveyed paper, textile, or flexible sheet material. A preferred transfer surface is a roll or roller, such as a calendar roll or a kiss roll. Other transfer surfaces that are less preferred are a forming wire or fabric and a conveyor belt or material which is then contacted with the conveyed sheet material. The transfer surface may be heated if desired.

The additive composition is preferably applied from the spray directly to at least one surface of the conveyed paper, textile, or flexible sheet material. In the manufacture of a paper product or a tissue paper product, the additive composition is preferably applied to at least one surface of a conveyed web containing paper fibers. The additive composition may be applied at either the wet end or dry end of the papermaking operation. Preferably, the additive composition is applied to the conveyed web after the web has been at least partially dried, more preferably after the web has been substantially dried. The web may be overdried or heated if desired. In the manufacture of a flexible sheet product, the additive composition is preferably applied to at least one surface of the conveyed flexible sheet material.

The distance from the spray orifice to the conveyed sheet material is not critical in the practice of the present invention. Generally the sheet material will be sprayed with the additive composition from a distance of about 4 inches to about 24 inches. A distance of about 6 inches to about 18 inches is preferred. A distance of 8 inches to about 16 inches is most preferred. The distance used will depend upon the particular application. Electrostatic spraying may be used if desired to increase application efficiency by using the methods disclosed in U. S. Pat. No. 5,106,650.

The spray may be directed to the conveyed sheet material by using stationary or reciprocating spray guns or by using other arrangements. Multiple spray guns may be positioned to give overlapping feathered spray deposition to produce uniform application across conveyed sheet materials that are wider than the spray width of a single spray. For many applications, particularly with additive compositions that are substantially free of volatile solvent, low application rates are desirable, for which smaller orifice sizes and wider spray fans are favored. A pre-orifice may be used to further reduce the spray rate.

The speed at which the paper, textile, or flexible sheet material is conveyed during the spray application is not critical to the practice of the present invention. Generally the speed will be that normally utilized in the particular manufacturing or converting operation. As mentioned, the speed is generally determined by the requirements of the product produced and the machine used. Preferably, the sheet material is rapidly conveyed to increase throughput. Although slower conveying speeds may be used, generally the speed will be above about 50 meters/minute, preferably above about 100 m/min, more preferably above about 150 m/min, still more preferably above about 200 m/min if suitable for the application. For some products, such as tissue papers, very high speeds may be used, such as above about 1000 m/min.

The amount of additive composition applied to the conveyed paper, textile, or flexible sheet material is not critical to the practice of the present invention and will generally depend upon the particular additive composition applied and the properties and performance desired of the particular product, which is known to those skilled in the art. The amount of additive composition applied is generally a balance between performance and cost. It is generally desirable to use the minimum amount of additive composition necessary for desired performance. For example, the level of softener applied to form a soft tissue paper should be at least an effective level for imparting a tactile difference in softness to the paper. The minimum effective level will vary depending upon the particular type of sheet material treated and the particular softener applied. Generally, amounts of the additive composition below about 0.1 weight percent, based on the finished basis weight of the sheet material provides little benefit to the facial tissue in terms of softness improvement, whereas amounts above 5 weight percent show little or no improvement in softness over the lesser amounts and may become economically unattractive. Higher amounts are also likely to leave a detectable residue on the skin.

On the other hand, additives such as lotions, which contain ingredients which are meant to be transferred to the skin, may generally be applied to the sheet material in a greater amount than additives that are meant just to modify the properties of the tissue itself. Although lesser or greater amounts may be applied, the additive composition will generally be applied in the range of from about 0.1 to about 50 weight percent, based on the weight of the sheet material. Typically, the amounts applied will be less than about 40 percent, more specifically less than about 30 percent, and still more specifically less than about 20 percent. Many additive compositions will be applied in amounts of about 0.1 to about 15 percent, more specifically from about 0.3 to about 10 percent. Some low-level additive compositions are desirably applied in amounts below about 5 percent, more specifically below about 3 percent.

The physical form of the additive composition applied to the paper, textile, or flexible sheet material is not critical to the practice of the present invention. Preferably, the application of the additive composition to the sheet material is macroscopically uniform. The applied additive composition may be in the form of a continuous or discontinuous film or coating, or may be a random, discontinuous droplet or particulate pattern, or consist of discrete droplets or particles. The applied additive composition may be liquid. semisolid, or solid when deposited on the sheet material. The applied additive composition may be absorbed into the sheet material or remain substantially on its surface. Preferably, the applied additive composition adheres to the sheet material.

If desired, post-application treatments, such as heating or drying, may be performed on the sheet material containing the applied additive composition.

While preferred forms of the present invention have been described, it should be apparent to those skilled in the art that methods may be employed that are different from those shown without departing from the spirit and scope thereof. In addition, those skilled in the art will recognize that other steps or operations in addition to those specifically described herein may be employed in the manufacture of sheet material products.

EXAMPLE 1

An additive composition comprising a modified silicone softener and lotion was sprayed using carbon dioxide as the compressed fluid by using a UNICARB® System Supply Unit with a UNICARB® spray gun and spray tip 0.03–08 with an orange pre-orifice manufactured by Nordson Corporation. The liquid mixture was sprayed at a temperature of 60° C. and a pressure of 1100 psi. A carbon dioxide concentration of 20% by weight provided an angular fan pattern having good atomization. Increasing the carbon dioxide concentration to 25% produced a softer, feathered spray pattern. Increasing the carbon dioxide concentration to 50% produced a decompressive spray having a very good fan pattern and fine atomization. This high level of carbon dioxide was uniformly mixed with the additive composition and decreased the spray application rate. A tissue paper sheet material was sprayed and a very light amount of the additive composition was uniformly applied.

EXAMPLE 2

Using the same apparatus and spray conditions as in Example 1, an additive composition comprising a modified lanolin softener and lotion was sprayed using 25% carbon dioxide in the liquid mixture. This produced a decompressive spray with an excellent fan pattern that was soft, wide, and very uniform. A tissue paper material was sprayed and a very light amount of the additive composition was uniformly applied. The carbon dioxide concentration was then increased to 50%, which produced a two-phase liquid mixture. The higher carbon dioxide concentration reduced the measured spray rate from 76 to 46 grams per minute. The spray uniformly applied the additive composition to the paper towel product.

EXAMPLE 3

Using the same apparatus as in Example 1, an additive composition comprising a quaternary amine salt was sprayed using 20% carbon dioxide in the liquid mixture at a temperature of 60° C. and a pressure of 1100 psi, which produced good atomization and a uniform spray pattern. Increasing the carbon dioxide concentration to 40% and the pressure to 1500 psi produced a two-phase liquid mixture and a slightly wider fan pattern. Tissue paper sheet materials were sprayed and very light amounts of additive composition were uniformly applied to the tissue paper sheet materials in each case.

EXAMPLE 4

Using the same apparatus as in Example 1, four different additive compositions, comprising (1) an absorbency composition containing lecithin, a quaternary amine, and polyethylene glycol; (2) lanolin; (3) a mixture of a quaternary amine, a surfactant blend, and propylene glycol; and (4) silicone oil, were all sprayed with 30% carbon

EXAMPLE 5

A hydrophilic anionic sulfosuccinate surfactant was sprayed using carbon dioxide as the compressed fluid by using a UNICARB® System Supply Unit (manufactured by Graco) with a UNICARBO Spray Gun and Spray tip 0.06–12 with a teal (0.05 gpm) preorifice manufactured by Nordson. The liquid mixture was sprayed at a temperature of 55 C. and a pressure of 1250 psi. A carbon dioxide concentration of >25% produced a decompressive spray having a very good fan pattern and fine atomization. As high as 60% carbon dioxide was used with equivalent results. This variability of carbon dioxide concentration was used to finely control the flow rate of the surfactant which in effect finely controlled the amount added to the nonwoven diaper cover-stock web. The cover-stock was sprayed and a very light amount of the additive was uniformly applied.

What is claimed is:

1. A method for the manufacture of a sheet material product, comprising contacting a fiber slurry with a wire screen to form a fiber web and removing water from the fiber web to form a sheet material; characterized in that the method further comprises:

(1) forming a liquid mixture in a closed pressurized system, said liquid mixture containing an additive composition and a compressed fluid comprising:

(a) an additive composition containing at least one additive material that modifies or enhances the properties or performance of the sheet material product; and (b) a compressed fluid which is present in an amount which renders said liquid mixture capable of being sprayed, which forms a liquid mixture with said additive composition, and which is a gas at standard conditions of 0° C. temperature and one atmosphere pressure (STP);

(2) spraying said liquid mixture by passing the mixture under a pressure of at least about 500 psi through an orifice to form a spray; and (3) applying said spray containing said additive composition to said sheet material being conveyed during the manufacture of said sheet material product and producing a sheet material product which is not a release sheet or a waterproofed textile product.

2. The method of claim 1, wherein the sheet material is paper, textile or a flexible sheet material.

3. The method of claim 1, wherein the sheet material contains paper fiber or is paper.

4. The method of claim 1 wherein the sheet material contains paper fiber and said sheet material product is tissue paper.

5. The method of claim 4, wherein said tissue paper product is selected from the group consisting of sanitary tissues, household tissues, industrial tissues, facial tissues, cosmetic tissues, soft tissues, absorbent tissues, medicated tissues, toilet papers, paper towels, paper napkins, paper cloths, and paper linens.

6. The method of claim 3, wherein said additive composition is applied to at least one surface of a conveyed web containing the sheet material.

7. The method of claim 6, wherein said additive composition is applied to said conveyed web of the sheet material after the web has been at least partially dried.

8. The method of claim 6, wherein the conveyed sheet material is at a conveying speed of more than 50 meters per minute.

9. The method of claim 1, wherein the liquid mixture is substantially free of volatile organic solvents and water.

10. The method of claim 1, wherein said liquid mixture is substantially free of water.

11. The method of claim 1, wherein said spray is a decompressive spray.

12. The method of claim 1, wherein the compressed fluid is carbon dioxide or ethane and is a supercritical fluid at the temperature and pressure at which said liquid mixture is sprayed.

13. The method of claim 1, wherein said additive material is selected from the group consisting of softeners, emollients, lubricants, moisturizers, lotions, creams, conditioners, absorbants, hydrophilizers, debonders, surfactants, oils, waxes, silicones, mineral oil, lanolin, derivatized lanolin, aloe extract, fatty alcohols, fatty acid esters, polyhydroxy compounds, and quaternary ammonium compounds and mixtures thereof.

14. The method of claim 1, wherein the additive composition is applied to the sheet material by first applying said additive composition to a surface from which said additive material is then transferred to said sheet material by contacting said surface with said sheet material.

* * * * *